(12) United States Patent
Chen et al.

(10) Patent No.: US 11,857,956 B1
(45) Date of Patent: Jan. 2, 2024

(54) SOLID ACID CATALYST FOR PREPARING D-GALACTOSE AND PREPARATION METHOD THEREOF

(71) Applicant: Syngars Technology Co., Ltd., Jinhua (CN)

(72) Inventors: Zhi Chen, Jinhua (CN); Qiang Huang, Jinhua (CN); Honghui Chen, Jinhua (CN); Xuming Shi, Jinhua (CN); Weimin Ni, Jinhua (CN); Xiangrong Hu, Jinhua (CN)

(73) Assignee: SYNGARS TECHNOLOGY CO., LTD., Jinhua (CN)

( * ) Notice: Subject to any disclaimer, the term of this patent is extended or adjusted under 35 U.S.C. 154(b) by 0 days.

(21) Appl. No.: 18/097,634

(22) Filed: Jan. 17, 2023

(30) Foreign Application Priority Data

Jul. 28, 2022 (CN) .......................... 202210897692.9

(51) Int. Cl.
*B01J 37/10* (2006.01)
*B01J 37/00* (2006.01)
*B01J 35/02* (2006.01)
*B01J 27/02* (2006.01)
*B01J 21/04* (2006.01)
*B01J 21/06* (2006.01)

(52) U.S. Cl.
CPC .............. *B01J 37/10* (2013.01); *B01J 21/04* (2013.01); *B01J 21/066* (2013.01); *B01J 27/02* (2013.01); *B01J 35/02* (2013.01); *B01J 37/0018* (2013.01)

(58) Field of Classification Search
CPC . B01J 37/10; B01J 21/04; B01J 21/066; B01J 27/02; B01J 35/02; B01J 37/0018
See application file for complete search history.

(56) References Cited

FOREIGN PATENT DOCUMENTS

CN 114789063 7/2022

OTHER PUBLICATIONS

"Conversion of carbohydrates into 5-hydroxymethylfurfural catalyzed by solid acid in deep eutectic solvents" Dissertation, Apr. 2016, English abstract.

*Primary Examiner* — James A Fiorito
(74) *Attorney, Agent, or Firm* — McDonnell Boehnen Hulbert & Berghoff LLP

(57) ABSTRACT

Disclosed is a solid acid catalyst for preparing D-galactose and a preparation method thereof. The method includes: S1. synthesis of a skeleton carrier: S11. preparation of a sodium aluminate solution and an organic template solution; S12. mixing the sodium aluminate solution with the organic template solution, and thoroughly shaking a resulting mixture to obtain a mixed solution; S13. adding a zirconium source to the mixed solution obtained in S12, and thoroughly mixing; S14. subjecting a reaction system obtained in S13 to a hydrothermal reaction to obtain a mixed crystal $ZrO_2/Al_2O_3$; and S15. rapidly heating the mixed crystal $ZrO_2/Al_2O_3$ obtained in S14 until the organic template is completely ashed, and washing a resulting product with absolute ethanol to obtain a white solid $ZrO_2/Al_2O_3$; and S2. soaking the skeleton carrier obtained in S1 in concentrated sulfuric acid such that sulfonyl is loaded on the skeleton carrier to obtain the target solid acid.

6 Claims, 1 Drawing Sheet

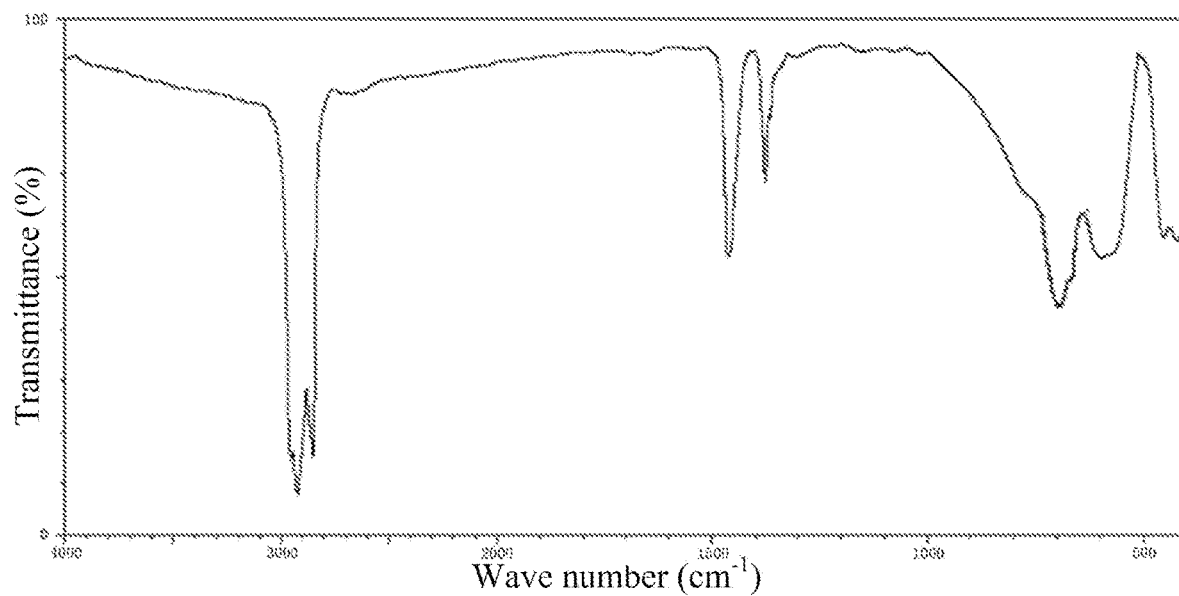

SOLID ACID CATALYST FOR PREPARING D-GALACTOSE AND PREPARATION METHOD THEREOF

CROSS-REFERENCE TO RELATED APPLICATION

This patent application claims the benefit and priority of Chinese Patent Application No. 202210897692.9, filed with the China National Intellectual Property Administration on Jul. 28, 2022, the disclosure of which is incorporated by reference herein in its entirety as part of the present application.

TECHNICAL FIELD

The present disclosure relates to the technical field of solid acid catalysts, and in particular to a solid acid catalyst for preparing D-galactose and a preparation method thereof.

BACKGROUND

Preparation methods of D-galactose mainly include an acid hydrolysis method, an enzymatic hydrolysis method, and an extraction method. In the enzymatic hydrolysis method, lactose is subjected to hydrolysis with lactase to prepare D-galactose, which involves a high cost and an uncontrollable reaction time and is not suitable for industrial production. In the extraction method, a plant polysaccharide is subjected to hydrolysis to prepare D-galactose, which involves cumbersome separation operations, a long reaction cycle, and difficult extraction and is not suitable for industrialization. The acid hydrolysis method is a common process in industrial production, which involves simple operations, a short reaction cycle, and a low cost.

In the traditional acid hydrolysis method, D-galactose is prepared through hydrolysis of lactose. Under the conditions of high temperature and high pressure, an inorganic acid is used to catalyze the hydrolysis of lactose into D-galactose and glucose, and a D-galactose product is further prepared through fermentation, separation, and purification.

In the prior art, a solid acid is further used as a catalyst for hydrolysis to produce D-galactose, and aluminum oxide is often used as a carrier for the solid acid. Aluminum oxide has a dense crystal structure with few pores, and thus the catalytic performance of the solid acid needs to be improved.

SUMMARY

A first objective of the present disclosure is to provide a preparation method of a solid acid catalyst for preparing D-galactose. In the present disclosure, zirconium dioxide and aluminum oxide are used to prepare a composite skeleton, which improves the specific surface area (SSA) of a carrier and improves the catalytic efficiency of the solid acid.

To solve this technical problem, the present disclosure adopts the following technical solution: A preparation method of a solid acid catalyst for preparing D-galactose is provided, including the following steps:

S1. synthesis of a skeleton carrier

S11. preparation of a sodium aluminate solution and an organic template solution dissolving sodium aluminate and sodium hydroxide in water to obtain the sodium aluminate solution; and dissolving a compound as an organic template and concentrated sulfuric acid in water to obtain the organic template solution;

S12. mixing the sodium aluminate solution with the organic template solution, and thoroughly shaking a resulting mixture to obtain a mixed solution, where a mass ratio of the sodium aluminate to the organic template is 1:9;

S13. adding a zirconium source to the mixed solution obtained in S12, and thoroughly mixing, where a molar ratio of zirconium to aluminum is (85-115):150;

S14. subjecting a reaction system obtained in S13 to a hydrothermal reaction to obtain a mixed crystal $ZrO_2/Al_2O_3$; and S15. rapidly heating the mixed crystal $ZrO_2/Al_2O_3$ obtained in S14 until the organic template is completely ashed, and washing a resulting product with absolute ethanol to obtain a white solid $ZrO_2/Al_2O_3$; and S2. soaking the skeleton carrier obtained in S1 in concentrated sulfuric acid such that sulfonyl is loaded on the skeleton carrier to obtain the target solid acid.

Preferably, in S2, the concentrated sulfuric acid has a mass fraction of 98%; and a mass of the skeleton carrier is 1 to 2 times a mass of the concentrated sulfuric acid.

In the present disclosure, a mass ratio of the concentrated sulfuric acid to the skeleton carrier is controlled to effectively ensure the loading of sulfonyl and make full use of the concentrated sulfuric acid.

Preferably, in S2, the sulfonyl loading is achieved as follows: placing the skeleton carrier in the concentrated sulfuric acid at 130° C., and stirring for 3 h. In the present disclosure, the soaking temperature and time and the continuous dynamics of the soaking process are controlled to ensure the full linking of sulfonyl and ensure that the prepared solid acid has prominent catalytic efficiency.

Preferably, in S11, the organic template is tetrapropylammonium bromide (TPAB). In the present disclosure, TPAB is used as an organic template to control the compound growth of aluminum oxide and zirconium dioxide to obtain $ZrO_2/Al_2O_3$ with a stable skeleton and a large SSA.

Preferably, in S11, a mass ratio of the sodium aluminate to the sodium hydroxide is 1:7; and a mass of the water is n times a total mass of the sodium aluminate and the sodium hydroxide, where 9<n<15. In the present disclosure, a concentration of the sodium aluminate solution is controlled to give consideration to operational safety, reaction speed, and reaction thoroughness.

Preferably, in S11, a mass ratio of the organic template to the concentrated sulfuric acid is 1:8; and a mass of the water is m times a total mass of the organic template and the concentrated sulfuric acid, where 9<m<15. In the present disclosure, a concentration of the organic template solution is controlled to ensure safe operation and rapid and thorough reaction.

Preferably, in S13, the zirconium source is zirconium sulfate.

Preferably, in S14, the hydrothermal reaction is conducted at:

a reaction temperature of 105° C. to 130° C.; and a reaction time of 10 h.

The hydrothermal reaction of the present disclosure ensures the synthesis of $ZrO_2/Al_2O_3$ while making the organic template active.

Preferably, in S15, the organic template is heated at a heating rate of 10° C./min to 500° C. and ashed at this temperature for 3 min. In the present disclosure, the organic template is rapidly removed to ensure that the prepared skeleton carrier is stable and has a large SSA.

A second objective of the present disclosure is to provide a solid acid catalyst for preparing D-galactose. The solid acid catalyst of the present disclosure has a stable skeleton, a long service life, and high recovery efficiency.

To solve this technical problem, the present disclosure adopts the following technical solution: A solid acid catalyst for preparing D-galactose is provided, which is prepared by the preparation method of the present disclosure.

With the above technical solutions, the present disclosure achieves the following beneficial effects:

In the prior art, aluminum oxide is often used as a carrier for a solid acid, and the use of aluminum oxide as a carrier for a solid acid mainly has the disadvantage that aluminum oxide has a dense crystal structure with few pores and aluminum in the aluminum oxide as an acid center can only load limited sulfonyl. The present disclosure provides a solid acid catalyst in which sulfonyl is loaded on a novel carrier. In the present disclosure, zirconium dioxide with porosity and skeleton stability cooperates with an organic template to modify an aluminum oxide material through a hydrothermal reaction to obtain a skeleton carrier $ZrO_2/Al_2O_3$, where during the hydrothermal reaction, the organic template provides crystal nucleation sites for the growth of a crystal, and when the crystal grows to a specified size, the organic template breaks and the crystal stops growing, thereby controlling a crystal size.

In the porous substrate $ZrO_2/Al_2O_3$ proposed by the present disclosure, aluminum as an active acid site can be linked to sulfonyl, Zr plays the role of stabilizing a skeleton, and Zr has metal characteristics and thus can load a part of sulfonyl. The porous substrate $ZrO_2/Al_2O_3$ product carrier has a large SSA, and thus aluminum can expose increased active sites for linking acidic groups. Therefore, the composite skeleton can improve the catalytic activity of the solid acid.

The solid acid catalyst synthesized by the present disclosure has a stable loading skeleton and a long service life, and can be repeatedly used many times. Once the catalytic efficiency of the solid acid catalyst is insufficient, the solid acid catalyst can be activated through simple steps, which can greatly reduce a use cost of the catalyst in industrial production.

BRIEF DESCRIPTION OF THE DRAWINGS

FIG. 1 is a molecular vibration spectrum of $ZrO_2/Al_2O_3$ prepared in Example 1 of the present disclosure.

DETAILED DESCRIPTION OF THE EMBODIMENTS

The technical solutions of the present disclosure are described in further detail below with reference to specific examples.

Example 1

A preparation method of a solid acid catalyst for preparing D-galactose was disclosed in this example, including the following steps:

S1. Synthesis of a skeleton carrier

S11. Preparation of a sodium aluminate solution and an organic template solution Sodium aluminate and sodium hydroxide were dissolved in water to obtain the sodium aluminate solution, where a mass ratio of sodium aluminate to sodium hydroxide was 1:7 and a mass of the water was 9 times a total mass of the sodium aluminate and sodium hydroxide; and a compound as an organic template and concentrated sulfuric acid were dissolved in water to obtain the organic template solution, where the organic template was TPAB, a mass ratio of the TPAB to the concentrated sulfuric acid (mass fraction: 98%) was 1:8, and a mass of the water was 9 times a total mass of the TPAB and the concentrated sulfuric acid.

S12. The sodium aluminate solution and the organic template solution were mixed and thoroughly shaken to obtain a mixed solution, where a mass ratio of the sodium aluminate to the organic template was 1:9.

S13. A zirconium source was added to the mixed solution obtained in S12, and a resulting mixture was thoroughly mixed, where a molar ratio of zirconium to aluminum was 85:150.

S14. A reaction system obtained in S13 was subjected to a hydrothermal reaction to obtain a mixed crystal $ZrO_2/Al_2O_3$, where the reaction system was placed in a polytetrafluoroethylene (PTFE) reactor and subjected to the hydrothermal reaction at 105° C. for 10 h to obtain the mixed crystal $ZrO_2/Al_2O_3$.

S15. The mixed crystal $ZrO_2/Al_2O_3$ obtained in $S_{14}$ was rapidly heated until the organic template was completely ashed, and then washed with absolute ethanol to obtain a white solid $ZrO_2/Al_2O_3$, where the organic template was heated at a heating rate of 10° C./min to 500° C. and ashed at this temperature for 3 min.

S2. The skeleton carrier obtained in S1 was soaked in concentrated sulfuric acid such that sulfonyl was loaded on the skeleton carrier to obtain the target solid acid, where the $ZrO_2/Al_2O_3$ solid was added to the concentrated sulfuric acid (mass fraction: 98%) with a mass ratio of concentrated sulfuric acid to $ZrO_2/Al_2O_3$ being 1:2, and the solid was soaked in the concentrated sulfuric acid at 120° C. for 3 h under stirring, then filtered out, and thoroughly washed with absolute ethanol to obtain the target solid acid $ZrO_2/Al_2O_3$—$SO_3$.

Example 2

A preparation method of a solid acid catalyst for preparing D-galactose was disclosed in this example, including the following steps:

S1. Synthesis of a skeleton carrier

S11. Preparation of a sodium aluminate solution and an organic template solution Sodium aluminate and sodium hydroxide were dissolved in water to obtain the sodium aluminate solution, where a mass ratio of sodium aluminate to sodium hydroxide was 1:7 and a mass of the water was 11 times a total mass of the sodium aluminate and sodium hydroxide; and a compound as an organic template and concentrated sulfuric acid were dissolved in water to obtain the organic template solution, where the organic template was TPAB, a mass ratio of the TPAB to the concentrated sulfuric acid (mass fraction: 98%) was 1:8, and a mass of the water was 11 times a total mass of the TPAB and the concentrated sulfuric acid.

S12. The sodium aluminate solution and the organic template solution were mixed and thoroughly shaken to obtain a mixed solution, where a mass ratio of the sodium aluminate to the organic template was 1:9.

S13. Zirconium sulfate was added to the mixed solution obtained in S12, and a resulting mixture was thoroughly mixed, where a molar ratio of zirconium to aluminum was 95:150.

S14. A reaction system obtained in S13 was subjected to a hydrothermal reaction to obtain a mixed crystal $ZrO_2/Al_2O_3$, where the reaction system was placed in a PTFE reactor and subjected to the hydrothermal reaction at 115° C. for 10 h to obtain the mixed crystal $ZrO_2/Al_2O_3$.

S15. The mixed crystal $ZrO_2/Al_2O_3$ obtained in S14 was rapidly heated until the organic template was completely ashed, and then washed with absolute ethanol to obtain a white solid $ZrO_2/Al_2O_3$, where the organic template was heated at a heating rate of 10° C./min to 500° C. and ashed at this temperature for 3 min.

S2. The skeleton carrier obtained in S1 was soaked in concentrated sulfuric acid such that sulfonyl was loaded on the skeleton carrier to obtain the target solid acid, where the $ZrO_2/Al_2O_3$ solid was added to the concentrated sulfuric acid (mass fraction: 98%) with a mass ratio of concentrated sulfuric acid to $ZrO_2/Al_2O_3$ being 1:2, and the solid was soaked in the concentrated sulfuric acid at 120° C. for 3 h under stirring, then filtered out, and thoroughly washed with absolute ethanol to obtain the target solid acid $ZrO_2/Al_2O_3$—$SO_3$.

Example 3

A preparation method of a solid acid catalyst for preparing D-galactose was disclosed in this example, including the following steps:

S1. Synthesis of a skeleton carrier

S11. Preparation of a sodium aluminate solution and an organic template solution Sodium aluminate and sodium hydroxide were dissolved in water to obtain the sodium aluminate solution, where a mass ratio of sodium aluminate to sodium hydroxide was 1:7 and a mass of the water was 13 times a total mass of the sodium aluminate and sodium hydroxide; and a compound as an organic template and concentrated sulfuric acid were dissolved in water to obtain the organic template solution, where the organic template was TPAB, a mass ratio of the TPAB to the concentrated sulfuric acid (mass fraction: 98%) was 1:8, and a mass of the water was 13 times a total mass of the TPAB and the concentrated sulfuric acid.

S12. The sodium aluminate solution and the organic template solution were mixed and thoroughly shaken to obtain a mixed solution, where a mass ratio of the sodium aluminate to the organic template was 1:9.

S13. Zirconium sulfate was added to the mixed solution obtained in S12, and a resulting mixture was thoroughly mixed, where a molar ratio of zirconium to aluminum was 100:150.

S14. A reaction system obtained in S13 was subjected to a hydrothermal reaction to obtain a mixed crystal $ZrO_2/Al_2O_3$, where the reaction system was placed in a polytetrafluoroethylene (PTFE) reactor and subjected to the hydrothermal reaction at 125° C. for 10 h to obtain the mixed crystal $ZrO_2/Al_2O_3$.

S15. The mixed crystal $ZrO_2/Al_2O_3$ obtained in S14 was rapidly heated until the organic template was completely ashed, and then washed with absolute ethanol to obtain a white solid $ZrO_2/Al_2O_3$, where the organic template was heated at a heating rate of 10° C./min to 500° C. and ashed at this temperature for 3 min.

S2. The skeleton carrier obtained in S1 was soaked in concentrated sulfuric acid such that sulfonyl was loaded on the skeleton carrier to obtain the target solid acid, where the $ZrO_2/Al_2O_3$ solid was added to the concentrated sulfuric acid (mass fraction: 98%) with a mass ratio of concentrated sulfuric acid to $ZrO_2/Al_2O_3$ being 1:2, and the solid was soaked in the concentrated sulfuric acid at 120° C. for 3 h under stirring, then filtered out, and thoroughly washed with absolute ethanol to obtain the target solid acid $ZrO_2/Al_2O_3$—$SO_3$.

Example 4

A preparation method of a solid acid catalyst for preparing D-galactose was disclosed in this example, including the following steps:

S1. Synthesis of a skeleton carrier

S11. Preparation of a sodium aluminate solution and an organic template solution Sodium aluminate and sodium hydroxide were dissolved in water to obtain the sodium aluminate solution, where a mass ratio of sodium aluminate to sodium hydroxide was 1:7 and a mass of the water was 15 times a total mass of the sodium aluminate and sodium hydroxide; and a compound as an organic template and concentrated sulfuric acid were dissolved in water to obtain the organic template solution, where the organic template was TPAB, a mass ratio of the TPAB to the concentrated sulfuric acid (mass fraction: 98%) was 1:8, and a mass of the water was 15 times a total mass of the TPAB and the concentrated sulfuric acid.

S12. The sodium aluminate solution and the organic template solution were mixed and thoroughly shaken to obtain a mixed solution, where a mass ratio of the sodium aluminate to the organic template was 1:9.

S13. Zirconium sulfate was added to the mixed solution obtained in S12, and a resulting mixture was thoroughly mixed, where a molar ratio of zirconium to aluminum was 115:150.

S14. A reaction system obtained in S13 was subjected to a hydrothermal reaction to obtain a mixed crystal $ZrO_2/Al_2O_3$, where the reaction system was placed in a polytetrafluoroethylene (PTFE) reactor and subjected to the hydrothermal reaction at 130° C. for 10 h to obtain the mixed crystal $ZrO_2/Al_2O_3$.

S15. The mixed crystal $ZrO_2/Al_2O_3$ obtained in S14 was rapidly heated until the organic template was completely ashed, and then washed with absolute ethanol to obtain a white solid $ZrO_2/Al_2O_3$, where the organic template was heated at a heating rate of 10° C./min to 500° C. and ashed at this temperature for 3 min.

S2. The skeleton carrier obtained in S1 was soaked in concentrated sulfuric acid such that sulfonyl was loaded on the skeleton carrier to obtain the target solid acid, where the $ZrO_2/Al_2O_3$ solid was added to the concentrated sulfuric acid (mass fraction: 98%) with a mass ratio of concentrated sulfuric acid to $ZrO_2/Al_2O_3$ being 1:2, and the solid was soaked in the concentrated sulfuric acid at 120° C. for 3 h under stirring, then filtered out, and thoroughly washed with absolute ethanol to obtain the target solid acid $ZrO_2/Al_2O_3$—$SO_3$.

Comparative Example 1

A liquid sulfuric acid catalyst was prepared in this comparative example.

Comparative Example 2

In this comparative example, a solid acid catalyst $Al_2O_3$—$SO_3$ was prepared as follows: aluminum hydroxide was soaked in $H_2SO_4$ with a mass fraction of 98% at 120° C. for 3 h under stirring, and a resulting solid was filtered out and washed with absolute ethanol to obtain the solid acid catalyst $Al_2O_3$—$SO_3$, where a mass ratio of $H_2SO_4$ to $Al_2O_3$ was 1:2.

Comparative Example 3

In this comparative example, a solid acid catalyst $ZrO_2$—$SO_3$ was prepared as follows: zirconium hydroxide was soaked in 98% $H_2SO_4$ at 120° C. for 3 h under stirring, and a resulting solid was filtered out and washed with absolute ethanol to obtain the solid acid catalyst $ZrO_2$—$SO_3$, where a mass ratio of $H_2SO_4$ to $ZrO_2$ was 1:2.

The solid acids obtained in Examples 1 to 4 and Comparative Examples 2 and 3 each were tested for SSA with an SSA tester, and test results were shown in Table 1. The SSA of the solid acid prepared with the zirconium dioxide-modified aluminum oxide as a skeleton carrier in the present disclosure was significantly increased compared with that of the zirconium dioxide solid acid and the aluminum oxide solid acid, and the SSA of the product increased with the increase of the zirconium dioxide content. The solid acid in Example 4 had an SSA of 380 m²/g, which was 2.24 times an SSA of the pure aluminum oxide solid acid catalyst in Comparative Example 2.

TABLE 1

SSA data of the solid acids obtained in Examples 1 to 4 and Comparative Examples 2 and 3

| Group | SSA (m²/g) |
| --- | --- |
| Comparative Example 2 | 169 |
| Comparative Example 3 | 342 |
| Example 1 | 345 |
| Example 2 | 367 |
| Example 3 | 371 |
| Example 4 | 380 |

The catalytic efficiency of the catalyst obtained in each of Examples 1 to 4 and Comparative Examples 1 to 3 was tested, and specific test data were shown in Table 2.

Lactose and a catalyst were added in a mass ratio of 1:0.1 to a reactor to allow a reaction under catalysis for 3 h, and a residual lactose content in a resulting reaction solution was tested according to the liquid chromatography (LC) method in the 2015 Chinese Pharmacopoeia:

With amino-bonded silica gel as a filler, acetonitrile-water (70:30) as a mobile phase, and a column temperature of 45° C., 10 μL of a solution was allowed to pass through a chromatographic column at a flow rate of 1.0 mL/min, and a lactose content was tested at a wavelength of 238 nm; and a residual lactose content in each reaction solution was tested.

Catalytic efficiency=(original lactose content−residual lactose content)/original lactose content*100%.

TABLE 2

Catalytic efficiency of the catalysts in Examples 1 to 4 and Comparative Examples 1 to 3

| Group | Catalytic efficiency/% |
| --- | --- |
| Comparative Example 1 | 78 |
| Comparative Example 2 | 61 |
| Comparative Example 3 | 55 |
| Example 1 | 79 |
| Example 2 | 81 |
| Example 3 | 83 |
| Example 4 | 86 |

In Comparative Example 2, aluminum oxide alone is used as a carrier for a solid acid, and a limited number of acidic groups are linked due to small SSA, resulting in low catalytic efficiency of the corresponding catalyst. In Comparative Example 3, zirconium dioxide itself exhibits poor linking performance for acidic groups, resulting in undesirable catalytic efficiency.

Zirconium has an atomic volume of 14.1 cm³/mol and aluminum has an atomic volume of 10.0 cm³/mol. In the present disclosure, a molar ratio of zirconium to aluminum is controlled actually to increase an SSA of a product through the combination of zirconium dioxide and aluminum oxide, increase an exposed surface of active sites of aluminum, and increase a number of acidic groups linked to aluminum. It can be known from the comparison between Comparative Examples 2 and 3 and Examples 1 to 4 that the present disclosure controls a molar ratio of zirconium to aluminum to improve the catalytic efficiency. FIG. 1 shows an infrared (IR) spectrum of a sheet sample of the $ZrO_2/Al_2O_3$ prepared in Example 1 of the present disclosure in an IR spectrometer. Specific spectrum analysis is as follows: an absorption peak of hydroxyl appears at 2,900, an IR characteristic peak of zirconium dioxide (Zr—O—Zr bond) appears at 674 cm⁻¹, and L acid characteristic peaks of aluminum oxide appear at 1,448 and 1,512. It can be known from the above results that characteristic peaks of zirconium dioxide and aluminum oxide appear during the test of the sample, indicating that $ZrO_2/Al_2O_3$ is prepared in Example 1.

The catalytic efficiency of the solid acid catalyst provided in the present disclosure is comparable to or even better than the catalytic efficiency of the liquid acid catalyst, indicating significant improvement of the catalytic efficiency.

The recycling effects of the solid acid catalysts obtained in Examples 1 to 4 and Comparative Examples 2 and 3 each were tested, and a specific operation method was as follows:

Ethanol was added to a mixed solution obtained after a catalytic reaction, a resulting mixture was stirred to precipitate unisomerized lactose and a part of the solid acid catalyst in the mixed solution, and a precipitated substance was filtered out to obtain a solution x, where a volume of the ethanol was ⅓ of a volume of the mixed solution obtained after the catalytic reaction; and ethanol was added to the solution x with a volume of the ethanol being twice a volume of the solution x to obtain a pure solid acid catalyst and an isomerized lactose solution y, and the isomerized lactose solution y was subjected to distillation to remove ethanol (ethanol could be reused) to obtain a monosaccharide-containing mixed solution. In the present disclosure, unisomerized lactose in the isomerized mixed solution was selectively precipitated and the solid acid was further separated through different concentrations.

A pure solid acid catalyst recovered after each catalysis of the solid acid catalyst of the present disclosure was reused five times to test a recycling effect of the solid acid catalyst, and specific test results were shown in Table 3.

TABLE 3

Catalytic efficiency of the solid acid catalysts obtained in Examples 1 to 4 and Comparative Examples 2 and 3 during five times of catalysis

| Group | First cycle/% | Second cycle/% | Third cycle/% | Fourth cycle/% | Fifth cycle/% |
| --- | --- | --- | --- | --- | --- |
| Comparative Example 2 | 61 | 55 | 49 | 42 | 34 |
| Comparative Example 3 | 69 | 66 | 65 | 64 | 61 |
| Example 1 | 79 | 77 | 76 | 74 | 71 |
| Example 2 | 81 | 78 | 77 | 75 | 74 |
| Example 3 | 83 | 82 | 80 | 77 | 75 |
| Example 4 | 86 | 84 | 81 | 78 | 77 |

It can be seen from the data in Table 3 that the solid acid catalyst provided by the present disclosure can be recycled; and after zirconium dioxide is added to the carrier, the stability of the overall structure of the solid acid catalyst is increased, and when the solid acid catalyst is repeatedly used, the catalytic efficiency of the solid acid catalyst decreases slowly. Therefore, it can be concluded that, because the composite skeleton of zirconium dioxide and aluminum oxide has high stability, the solid acid catalyst can be repeatedly used many times, which is conducive to industrial production.

What is claimed is:

1. A preparation method of a solid acid catalyst for preparing D-galactose, comprising the following steps:
    S1. synthesis of a skeleton carrier
    S11. preparation of a sodium aluminate solution and an organic template solution
        dissolving sodium aluminate and sodium hydroxide in water to obtain the sodium aluminate solution; and
        dissolving a compound as an organic template and concentrated sulfuric acid in water to obtain the organic template solution;
    S12. mixing the sodium aluminate solution with the organic template solution, and thoroughly shaking a resulting mixture to obtain a mixed solution,
        wherein the organic template is tetrapropylammonium bromide (TPAB) and
        a mass ratio of the sodium aluminate to the organic template is 1:9;
    S13. adding a zirconium source to the mixed solution obtained in S12, and thoroughly mixing, wherein a molar ratio of zirconium to aluminum is (85-115):150;
    S14. subjecting a reaction system obtained in S13 to a hydrothermal reaction at 105° C. to 130° C. for 10 h to obtain a mixed crystal $ZrO_2/Al_2O_3$; and
    S15. heating the mixed crystal $ZrO_2/Al_2O_3$ obtained in S14 until the organic template is completely ashed, and washing a resulting product with absolute ethanol to obtain a white solid $ZrO_2/Al_2O_3$,
        wherein the organic template is ashed at 500° C. for 30 min; and
    S2. soaking the skeleton carrier obtained in S1 in concentrated sulfuric acid such that sulfonyl is loaded on the skeleton carrier to obtain the solid acid catalyst.

2. The preparation method according to claim 1, wherein in S2, the concentrated sulfuric acid has a mass fraction of 98%; and
    a mass of the skeleton carrier is 1 to 2 times a mass of the concentrated sulfuric acid.

3. The preparation method according to claim 1, wherein in S2, the sulfonyl loading is achieved as follows: placing the skeleton carrier in the concentrated sulfuric acid at 130° C., and stirring for 3 h.

4. The preparation method according to claim 1, wherein in S11, a mass ratio of the sodium aluminate to the sodium hydroxide is 1:7; and a mass of the water is n times a total mass of the sodium aluminate and the sodium hydroxide, wherein 9<n<15.

5. The preparation method according to claim 4, wherein in S11, a mass ratio of the organic template to the concentrated sulfuric acid is 1:8; and a mass of the water is m times a total mass of the organic template and the concentrated sulfuric acid, wherein 9<m<15.

6. The preparation method according to claim 1, wherein in S13, the zirconium source is zirconium sulfate.

* * * * *